Oct. 19, 1965          J. R. V. DOLPHIN          3,212,654
APPARATUS FOR LOADING AND UNLOADING GOODS
Filed Nov. 21, 1963                         7 Sheets-Sheet 2
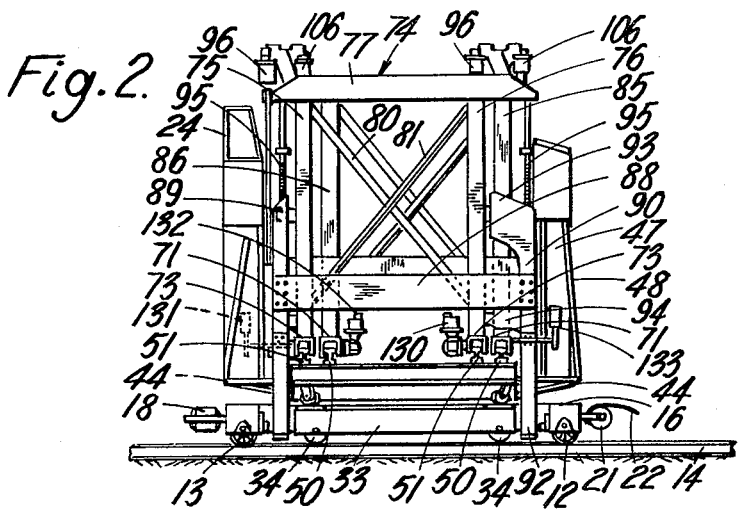
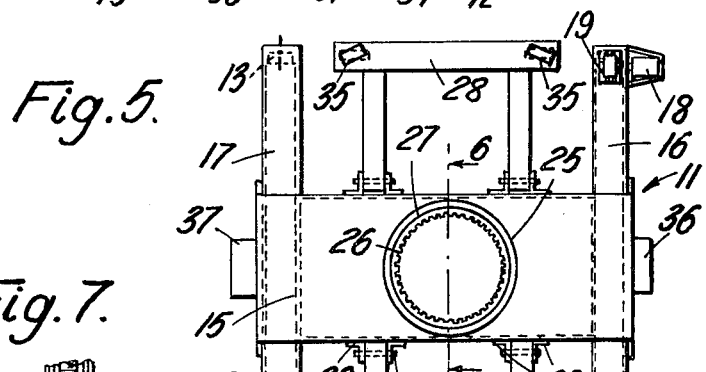
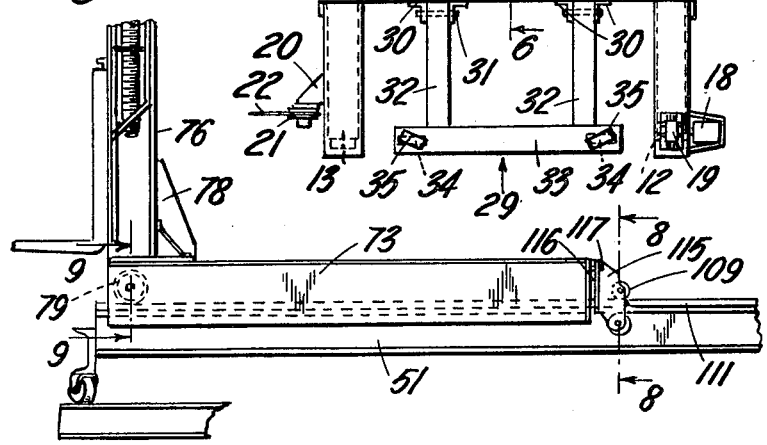
INVENTOR
John R. V. Dolphin

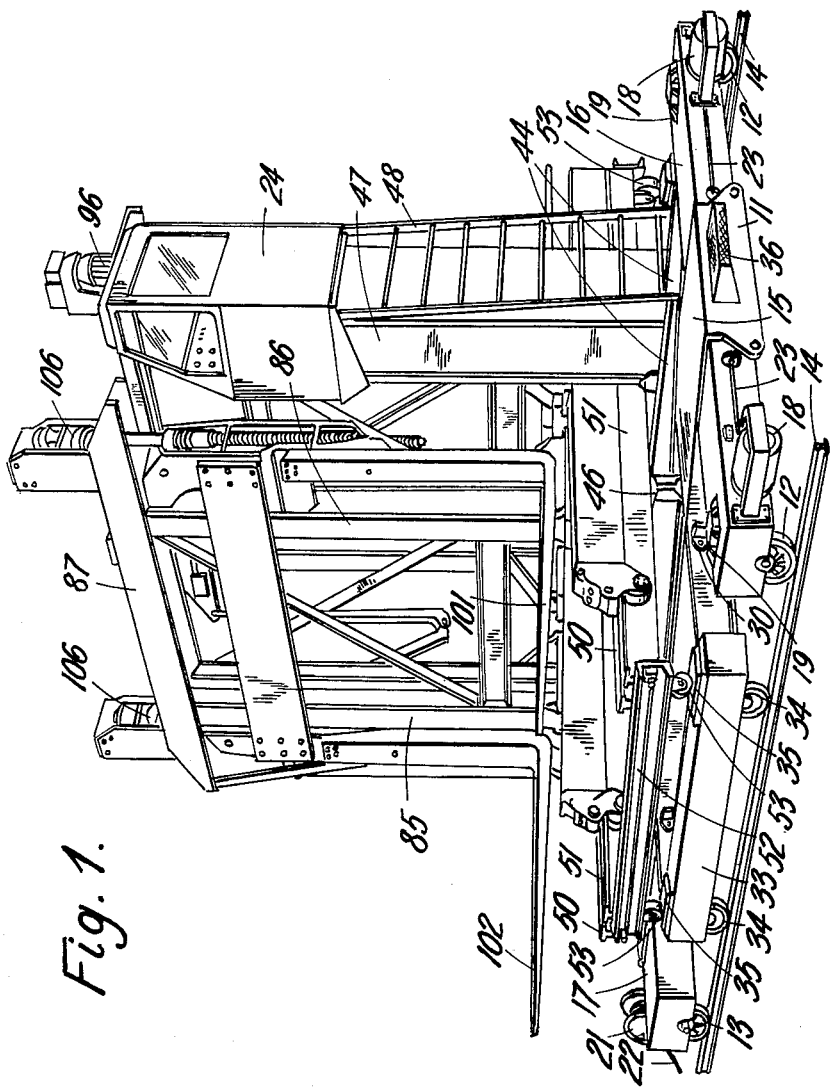

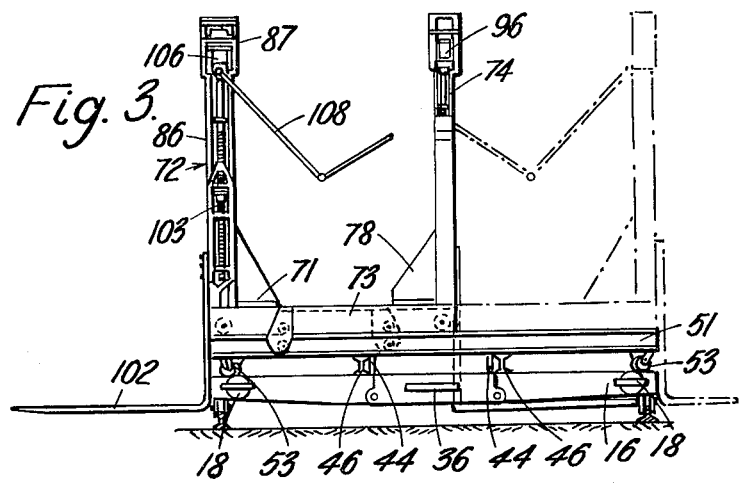
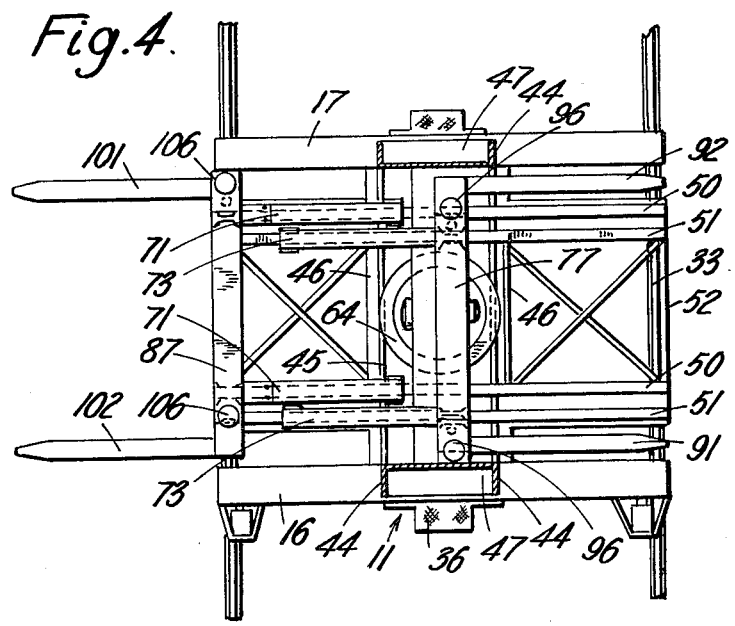

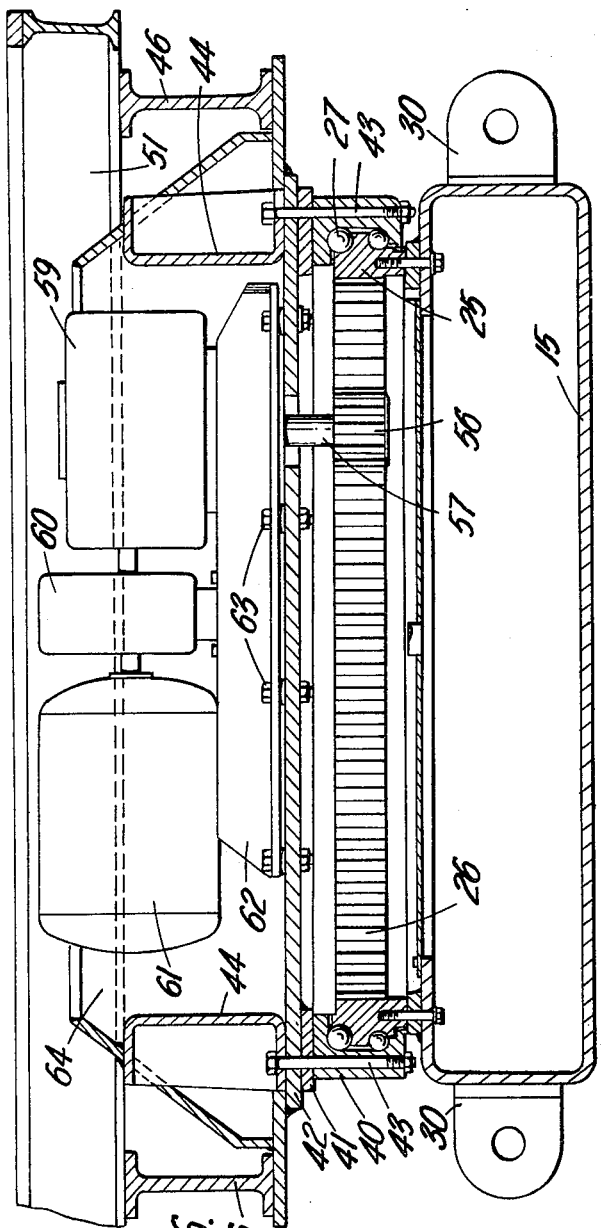

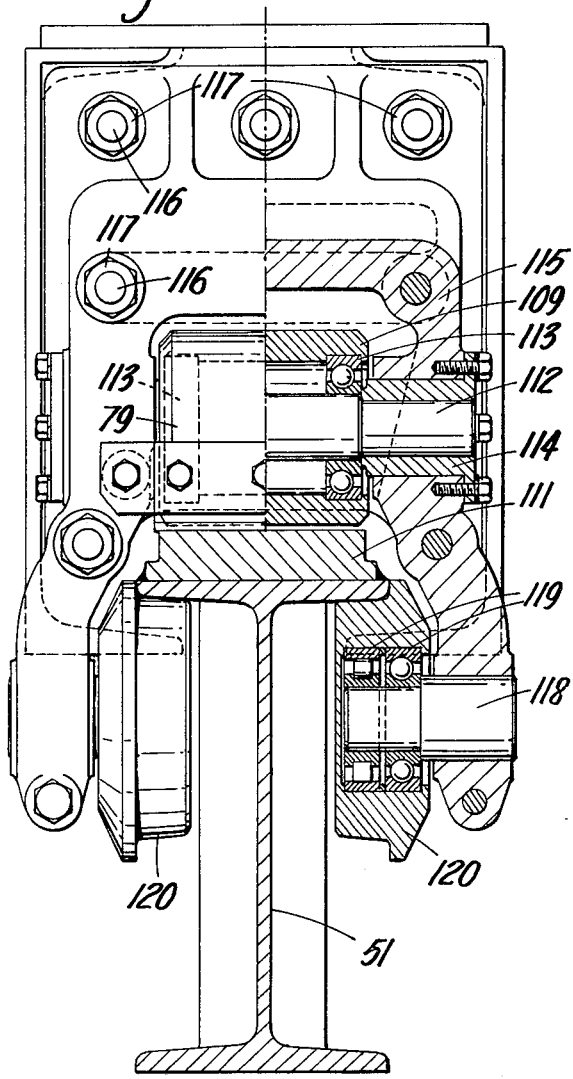

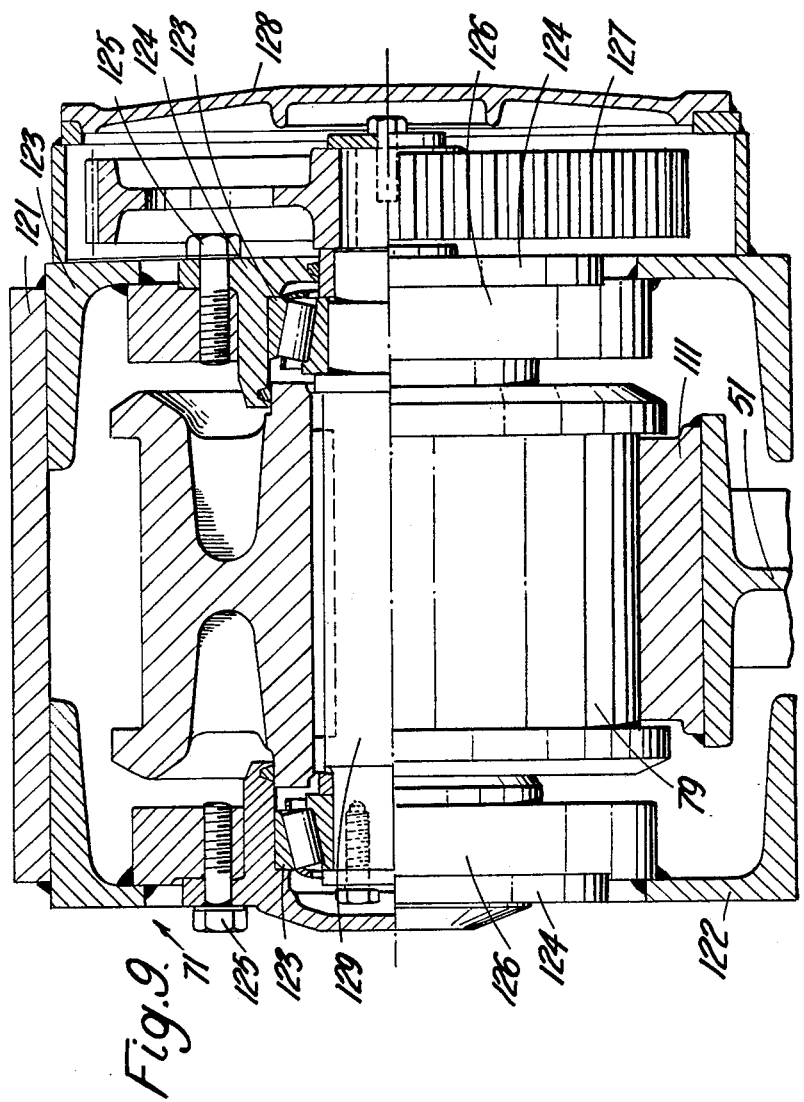

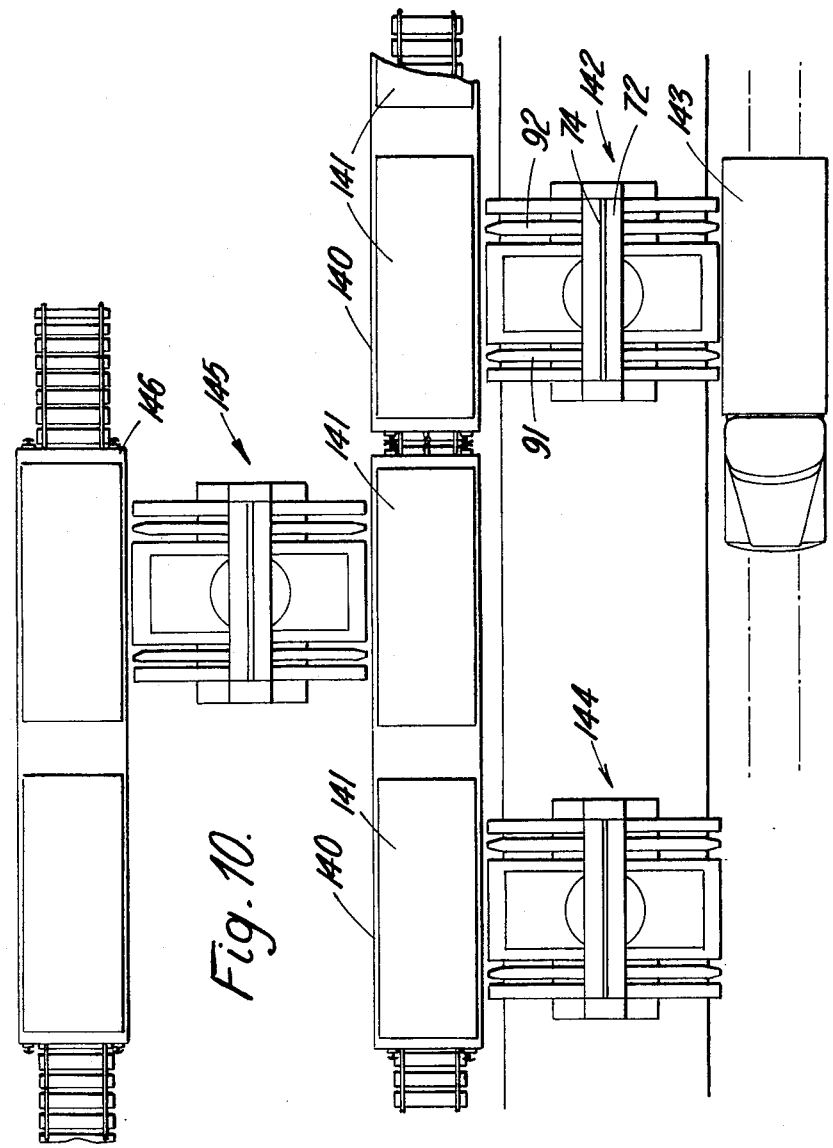

United States Patent Office 3,212,654
Patented Oct. 19, 1965

3,212,654
APPARATUS FOR LOADING AND UNLOADING GOODS
John Robert Vernon Dolphin, Basingstoke, England, assignor to Lansing Bagnall Limited, Basingstoke, Hampshire, England, a British company
Filed Nov. 21, 1963, Ser. No. 325,251
10 Claims. (Cl. 214—38)

This invention comprises improvements in or relating to apparatus for loading and unloading goods from vehicles and the like.

It is an object of the invention to provide a loading and unloading apparatus which is suitable for use for automatic or semi-automatic loading and unloading of railway vehicles, but the invention is not confined to railway vehicles.

According to the present invention the loading or unloading apparatus comprises a turntable on which reach forks or their equivalent are mounted, which turntable is supported on a base capable of being located between two vehicles, for example a rail vehicle and a road vehicle, so that the forks or their equivalent can reach goods out of one and load them into the other.

The invention is particularly useful for dealing with goods which are handled in containers on flat railway wagons or flat top lorry chassis.

The use of a turntable in this way prevents the goods removed from blocking the space beside the wagon and, if there are two reach mechanisms on opposite sides of the turntable, one set can load or unload a rail wagon while the other set is unloading or loading a lorry disposed on the opposite side of the turntable. If both the lorry and the wagon are loaded both loads can be unloaded on to the turntable simultaneously and rotation of the turntable will enable the wagon to be re-loaded with the goods which were on the lorry and the lorry to be loaded with the goods which were on the wagon.

If there is a series of such turntables alongside a train of wagons a number of wagons can be loaded or unloaded simultaneously, either the whole, or a number of them corresponding to the number of turntables available. If only part of the wagons can be dealt with simultaneously, then after dealing with a first batch a further set of wagons can be dealt with.

The turntable greatly speeds up operation, especially as the loading may be effected by remote control and even be made automatic in the case of a train load of similar containers. In that case, all that the staff have to effect is the operation of a series of control switches allocated to the various turntables. This can be done either by station staff or by the personnel in charge of the train or the lorry as may be most convenient and the system is thus peculiarly flexible and adaptable to different conditions. For example, at a small country station a single turntable may suffice whereas at a large depot there may be turntables sufficient to operate on a whole train at once.

Each turntable in effect constitutes a loading machine. It can be located at a fixed point or alternatively it can be mounted on rails or a carriageway so that it can be moved along to various points along the train. The reach forks or the like which are mounted upon it should preferably be provided with a mechanism which enables them to be lifted to load-level and to raise a load off the floor of the train or lorry.

Such a mechanism allows for variation in height of lorry platforms and, if necessary, affords compensation in height for the weight of the load of a sprung carriage or vehicle.

In a preferred construction, reach carriages are provided on the turntable on which are mounted reach masts and the masts are provided with lifting carriages on which the reach fork-arms (or their equivalent) are mounted.

Furthermore, there may be two masts arranged back-to-gack so that one mast may reach to or from one side of the turntable while the other mast reaches to or from the other side.

In order to afford the maximum reach movement, the guided carriages for the masts which are back-to-back with one another may be arranged to overlap in the centre of the turntable, the masts being located at the forward edges of the carriages.

When these turntables with their reach masts are installed in a series alongside a railway track they may consist of a frame supported on a fixed base at ground level with a ball or roller bearing track between the frame and base to support it against load. The masts are sufficiently high to enable the reach forks which they carry to be lifted to the level of a railway wagon or lorry and the lift is thus sufficient to enable loads to be taken off or deposited upon all the heights of vehicle which are available or to be taken upon from or deposited upon the ground, as desired. For this purpose the masts do not need to be high. A total height of lift or five or six feet is sufficient. The masts and lifting devices thereon can lift a container twenty feet long and weighing twenty-five tons.

When a series of turntable mechanisms is provided alongside a railway truck, properly spaced to correspond with the spacing of containers on a railway train, the sequence of loading and unloading operations, or the arrangement of the gear so that the operations can be carried out simultaneously, becomes important.

According to one feature of the present invention a system of unloading and loading containers carried on a series of vehicles comprises a track for a series of vehicles, sets of turnable reach mechanisms located alongside both sides of the track spaced so that the set on one side can engage alternate containers carried on the series of vehicles and those on the other side can engage the intermediate containers and further tracks for vehicles on the outer side of both the sets of turntables. By this means, containers may be unloaded or loaded on the series of vehicles, which may be a train of flat-topped railway trucks, simultaneously for all the containers for which turntable reach mechanisms are provided. The tracks for vehicles on the outer side of the sets of turntables may be suitable for the disposal of motor vehicles in position to receive or deliver containers to the turntables or they may alternatively be railway tracks. Preferably, according to the present invention, some or all of the tracks are railway tracks but they are sunk flush with the concrete surface so that either railway vehicles or road vehicles may be employed or, if desired, instead of ordinary road vehicles, fork trucks for handling goods may be used.

Alternatively, according to the present invention, in a system of turntable unloaders, provided with reach mechanism, alongside a railway track, the turntables are arranged in pairs close together and are arranged to be rotated through 90° or 180° at will. If this arrangement is adopted, a suitable sequence of operation must be employed. Thus, to unload a wagon carrying two containers one turntable is reach-operated to unload one container and rotated through 90° with the container turned away from the other turntable. The other turntable is reach-operated to unload the second container and can be rotated through 180° because the first container is out of the way. When the second turntable has been unloaded the first can complete its movement through 180° and be unloaded. The 90° movement of the first turntable can take place either before, during or after the reach movement of the second turntable.

Alternate containers of a whole train can be unloaded simultaneously if there are enough turntables and thus a train can be very quickly unloaded.

If it is to be re-loaded this can be done equally quickly by reversing the operations, reaching loads from, for example, waiting lorries and placing them on the train; the operations of loading and unloading are preferably combined as hereinafter described.

The following is a description, by way of example, of apparatus embodying the invention, reference being made to the accompanying drawings, in which:

FIGURE 1 is a perspective view of a travelling turntable device in accordance with the invention;

FIGURE 2 is a side elevation of the same to a smaller scale;

FIGURE 3 is a front elevation;

FIGURE 4 is a plan;

FIGURE 5 is a plan of the undercarriage of the machine shown in FIGURES 1 to 4;

FIGURE 6 is a vertical section through the centre of the turntable mechanism and its driving gear showing some part of the framework which carries the reach mechanism of the masts;

FIGURE 7 is a detail of reach mechanism;

FIGURE 8 is partly a vertical section to a larger scale upon the line 8—8 of FIGURE 7 looking in the direction of the arrows and is partly a front elevation of the same;

FIGURE 9 is a vertical section upon the line 9—9 of FIGURE 7 looking in the direction of the arrows; and FIGURE 10 is a plan of part of an installation of turntables for unloading and loading trains of rail vehicles.

Referring to FIGURE 1 this shows an unloading machine which comprises a chassis 11 having wheels 12, 13 for running on rails 14. This machine and the rails 14 are intended to be installed alongside a railroad track so that it can be run along the rails 14 to any desired point of a train of rail vehicles which is to be loaded or unloaded. On the opposite side of the rails 14 from the railroad track therewould be a concrete road surface on which road vehicles could be drawn up to deliver or receive loads to or from the railroad train. The undercarriage 11 is best seen in the plan, FIGURE 5, and it includes a longitudinal box-section central portion 15 which is welded to box-section cross-members 16, 17 at the ends. The wheels 12 are mounted in the ends of the cross-members 16 and are driven by electric motors 18 through gear boxes 19. The details of the motors and gear boxes are standard practice and need not be further described. The wheels 13 are mounted on the ends of the cross-member 17 of the chassis and are undriven. On the member 17 is a bracket 20 which carries a cable drum 21 for a trailing supply cable 22. The drum rotates if the machine is driven along the tracks 14 to take in or pay out cable, according to the direction of travel and slip rings connected to the cable, which are not shown in the drawing, are connected by cables 23 (FIGURE 1) which pass through the interior of the box-shaped members of the chassis to control apparatus in a cabin 24 hereinafter described, and to the electric motors 18. As the trailing cable drum 21 and its associated parts are standard practice in mobile machines of this character they need not be herein further described.

In the centre of the box-shaped member 15 of the chassis is a turntable support ring 25 which is internally toothed like a gear at 26 and is provided with a ball race portion 27. These parts are shown in detail to a larger scale in the vertical section, FIGURE 6, which is taken upon the line 6—6 of FIGURE 5. In addition, the chassis comprises two pivoted supporting frames, 28, 29, one on each side of the central box member 15. The supporting frames are secured to brackets 30 on the sides of the box-shaped member 15 by pivots 31. Each supporting frame consists of two box-section pivoted legs 32 which are united by the box-shaped cross-member 33. The pivoted supporting frames rest on wheels 34 which run on the rails 14 between the wheels 12 and 13 and the upper sides of the members 33 carry supporting pads 35 for the superstructure which rotates on the turntable ring 25. The ends of the chassis 11 are provided with central projections 36, 37 which act as tread plates to enable an operator to board the machine.

Referring again to FIGURE 6, on the supporting ring 25 which carries the race portion 27, there is mounted a turntable ring 40 on to which a ring-shaped plate 41 and square plate 42 are secured by bolts 43. The bolts 43 also hold down transverse channel members 44 and the channel members are further secured by being welded to the plate 42 of the structure. Further, on the plate 42 there is welded an extension plate 45 which supports transverse I-beams 46. The I-beams 46 and the channel members 44 can be clearly seen in FIGURE 1 which shows that the channel members are extended to form a support for a box 47 which contains the control gear and supports the control cabin 24. The channel members 44 also support a ladder 48 which affords access to the cabin. At the other end of the channel members 44 they are extended as shown in FIGURE 2 to support another control box 47 containing electric control gear. The I-beams 46 and the channel members 44 further support cross I-beams 50, 51 which are arranged in pairs as best seen in the plan, FIGURE 4, and extend right across the machine from side to side and are united at their ends by channel members 52 which overlie the pivotally-supported box-shaped members 33 of the undercarriage. This criss-cross structure of I-beams and channels constitutes the turntable and at its corners it rests on rollers 53 which in the position of the parts shown, rest on the pads 35 of the supporting members 33. The purpose of the pivot frames 29 with their cross-members 33 and pads 35 is to afford support to the turntable when it is in the position shown in the drawing and when the reach mechanism hereinafter described is advanced so that it overhangs the side of the mechine and serves to lift a load off a railroad vehicle or a road vehicle. When the reach mechanism has been retracted so that the load is carried over the chassis 11 the turntable can be rotated without needing such lateral support and therefore the pads 35 are provided only over the limited area shown in the drawings.

Returning to FIGURE 6, the turnable is rotated by means of a pinion 56 which meshes with the teeth 26 of the supporting ring 25. The pinion 56 is carried on a shaft 57 which depends from a gear-box 59 driven by an electric motor 61. The electric motor is connected by the gear-box by a coupling in the casing 60, the outer periphery of which coupling acts as a brake drum for a solenoid-operated brake mechanism and these parts are carried on brackets 62 secured by bolts 63 to the plate 42 already referred to. All these parts therefore rotate with the turntable and the electric control gear can be carried on the structure of the turntable and connected to the control panel in the cabin 24. The parts are surrounded by a conical protecting member 64 which is concentric with the turntable ring 40 and is welded to the plate 45. It should be noted that while the channel members 44 are shown in FIGURE 4 the cabin 24 has been removed in order to avoid undue complication of the figure. Also, in FIGURE 3 of the drawing the boxes 47, as well as the cabin 24, are omitted for the same reason.

Referring now more particularly to FIGURES 2, 3 and 4, it will be noted that the I-beams 50, 51 are arranged in two pairs close together, the members 50 which are the uppermost members of each pair (as viewed in FIGURE 4) supporting carriages 71 which support a mask 72 (FIGURE 3). The I-beam 51 which constitute the lower members of the pairs as viewed in FIGURE 4 support similar carriages 73 which support a second mast 74. As the masts are similar (though they face in opposite directions) it will be sufficient to describe one of them. The structure of the mast 74 is best understood by comparing FIGURES 2 and 7. The mast consists of two uprights 75, 76 which are united by a cross-member at the top 77 and rest at the bottom on the two carriage members 73, the connection to the members 71 being rendered more rigid by gusset plates 78. The mast side members 76 are located at the extreme forward end of the runners 73 and the weight is supported by rollers 79, the detail of which appears in FIGURE 9 and is hereinafter described. The side members 75, 76 are tied together by cross-stays 80, 81 (FIGURE 2). It will be noted that the uprights are not quite symmetrical with regard to the top cross-member 77 but are displaced a little to one side, that is to the left as viewed in FIGURE 2, and toward the top of the figure as viewed in FIGURE 4. It will be noted that FIGURE 2 views the machine from the back as considered in FIGURE 1 of the drawing, that is the far side from the beholder. Uprights 85, 86 for the mast 72 are similarly displaced in the opposite direction and thus both the masts can run back to the centre of the machine. The cross-member 87 of the second mast which rests on the uprights 85, 86 can be seen in FIGURE 4 of the drawing as well in FIGURE 1.

The uprights 75, 76 are of cannel-section with the flanges facing outwards away from each other and on the uprights there runs a vertically movable carriage consisting of a cross-member 88 and two upright side members 89, 90. The members 89, 90 carry fork arms 91, 92 respectively and attached to them are rollers which run in the grooves of the uprights 75, 76. It will be noted that the upright 90 has offset brackets 93, 94 to which the rollers are attached so that although the mast uprights are not symmetrical with the undercarriage the fork arms 91, 92 are symmetrical and can operate at ground level in the spaces shown in FIGURE 5 between ends of the cross-members 16, 17 and the ends of the box-shaped supporting members 28, 33.

The carriage is raised and lowered by vertical lead screws 95 operable by gearing in the cross-member 77 by electric motors 96. In a similar way the carriage on the other mast carries fork arms 101, 102 and the carriage is movable vertically by lead screws 103 actuated by electric motors 106 on the cross-member 87. The motors are supplied with power through jointed carriers 108 (FIGURE 3) from the control box 47.

FIGURE 8 shows the I-beam guide member 51 in section and a wearing strip 111 welded along its upper surface. On this runs a roller 109, which is supported by a fixed axle 112 through ball races 113. The axle 112 is carried in bushes 114 in a casting 115 secured at the rear end of the runner 73 by studs 116 and nuts 117, as also shown in FIGURE 7. The casting 115 extends downwardly on each side of the wearing strip 111 and carries stub axles 118 on which are mounted raceways 119 which support flanged rollers 120. The rollers 120 engage the underside of the top flange of the I-beam 51 and resist tipping movement of the mast 74 under load on the forks 91, 92.

FIGURE 9 shows not only the roller 79 on the wearing strip 111 but also the way in which the member 73 is built up from a top plate 121 welded to side channels 122. The roller 79 is keyed to a live axle 129 supported by roller bearings 123 carried in housings 124 secured by set screws 125 to machined rings 126 welded inside the side channels 122. At one end the axle 129 is extended beyond its bearing and has keyed on to it a driving spur-wheel 127, covered by a casing 128. In the casing 128 is a pinion (not shown) which is driven by a motor 130. The motor 130 does not appear in FIGURE 9 but can be seen in FIGURE 2 of the drawings. The corresponding roller in the other runner 73 is driven by a motor 131 which can be seen in dotted lines in FIGURE 2 and is carried on an extended shaft to avoid fouling the fork 91. The corresponding motors for the second mast 72 are shown at 132 and 133.

A machine as above described can be run along to any point beside a train of railroad vehicles and used to lift containers off the vehicles, retract them by the forks on to the machine and to rotate the container by means of the turntable through 180° and then deposit it upon a lorry on the other side of the machine. Alternatively, it can lift a load off the lorry and deposit it on the railroad vehicle. In FIGURE 10 of the drawings a part of a train of flat-topped railroad vehicles 140 is shown each of which carries two containers 141. A machine as just described is shown at 142 with a flat top road vehicle 143 on the other side of it from the railroad train. The forks 91, 92 on the mast 74 are shown pointing in one direction and corresponding forks on the mast 72 pointing in the opposite direction.

It will be obvious that if a series of road vehicles are driven up beside the machine 142, the machine being positioned successively opposite each of the containers 141 on the train, it can unload or load-up the train on or off the road vehicles and this process will be much quicker than endeavouring to transfer the containers by a crane. If more speed is desirable a second machine, such as 144, can be provided and used simultaneously with the first.

FIGURE 10 however also demonstrates an alternative method of loading or unloading a railroad train. If, instead of the machines 142, 144 being mounted on an undercarriage and running on rails, the undercarriage is omitted and the turntable is mounted on a fixed concrete base they can be located at intervals along the train which enables them to deal with alternate containers 141 and another machine, such as 145, can be located on the opposite side of the train to deal with the intermediate containers and transfer them between the train vehicles 140 and other vehicles, such as the railroad vehicle 146 shown located at a third loading position on the opposite side of the machine 145 from the train vehicles 140. The vehicle 146 might either be part of a railroad train or it might be a road vehicle similar to the vehicle 143. As all the machines 142, 144 and 145 and any other similar machines located along the train can be used simultaneously a train can be loaded or unloaded at very high speed and if sufficient machines are provided a considerable length of train can be dealt with in the time that it takes to transfer containers to or from the train from the vehicles 143 or 146. It is possible to provide a central control station, with remote control to the machines, so that the whole of them can be operated from the central control station by a single operator, thus saving personnel. This control station would take the place of the control cabin mounted on the machine and the control is simplified by the fact that all the containers on a train would be at the same height and in a properly organised system all the vehicles 143, 146 would also have flat tops which would be at the same height within an inch or two of one another. The positioning of the trains in relation to the machines can be effected by known means.

I claim:

1. Loading and unloading apparatus comprising in combination, a chassis, ground-wheels for enabling the chassis to move over the ground, a turntable base on the chassis, a turntable mounted on the base, two sets of horizontal guides on the turntable which extend across the same parallel to one another, two sets of runners movable on the guides, two masts supported one on each of the sets of runners so that each of the masts may be retracted to the centre to stand back-to-back and advanced along their guides toward one side of the turntable, a carriage movable vertically on each of the masts and a load supporting device on each carriage on the side of the mast facing outwards.

2. Apparatus as claimed in claim 1, wherein the chassis carries hinged support frames which extend from it laterally and also have ground-wheels by which they are supported from the ground, the support frames having mounted on them means for engaging and supporting the turntable when it is in position to cause the reach mechanisms to reach out from the side of the chassis.

3. Apparatus as claimed in claim 1, wherein in order to enable both masts to be alike, the runners of each are displaced toward one side thereof sufficiently to enable them to clear the runners of the other.

4. Apparatus as claimed in claim 1, wherein the load-lifting devices are forks which hang down below the level of the carriage on the mast which supports them so that they may be lowered to ground level and wherein beside the guides on the turntable there are spaces extending downwards to receive the forks, when so lowered which spaces, when the turntable is in the load-lifting position of orientation, coincide with spaces afforded in the base which supports the turntable.

5. Apparatus as claimed in claim 1, wherein the runners carry rollers to run on the guides and on each runner one of the rollers is driven by a motor through a reduction gear to effect reach movement of the mast.

6. Apparatus as claimed in claim 1, in which the vertically movable carriages are raised and lowered by lead screws rotatable by motors through reduction gear mechanism.

7. Apparatus as claimed in claim 1, wherein an operator-control station and control devices are provided on the turntable to rotate therewith and control the rotation height and reach movements.

8. Apparatus as claimed in claim 1, wherein the turntable comprises a large co-axial bearing for resting on a corresponding bearing-member mounted on the base, the bearing-member on the base has an internally-toothed gear circle within it and the turntable carries a motor, reduction gear, and pinion to mesh with the internally toothed gear, to rotate the turntable.

9. Loading and unloading apparatus comprising in combination a railroad track, a vehicle track parallel therewith and spaced therefrom, a series of chassis between the two tracks spaced apart to correspond to the spacing of loads on the railroad track, turntable bases on the chassis, turntables on each base, two sets of horizontal guides on each turntable which extend across the same parallel to one another, sets of runners in each of the sets of guides, two masts per turntable mounted on the runners so that each mast may be retracted to the centre of the turntable, to stand back-to-back and may be advanced toward one side of the turntable, a carriage movable vertically on each of the masts and a load supporting device on each carriage on the side of the mast facing outwards.

10. Loading and unloading apparatus as claimed in claim 9, wherein there is a series of bases and turntables on both sides of the railroad track, the spacing of each series being such that where a train is drawn up between them they correspond to alternate containers on the train and wherein two vehicle tracks are disposed, one outside each row of bases, to enable vehicles thereon to deliver and receive containers to be loaded on and unloaded from the railroad train.

References Cited by the Examiner

UNITED STATES PATENTS

| 1,953,056 | 3/34 | Olen _____ 214—670 |
| 2,004,095 | 6/35 | Hankins et al. _____ 214—38.20 |
| 2,117,274 | 5/38 | Buettell. |
| 2,629,507 | 2/53 | Olson. |
| 2,785,809 | 3/57 | Riblet. |
| 2,989,202 | 6/61 | De Canniere et al. ____ 214—730 X |

FOREIGN PATENTS

| 1,242,571 | 8/60 | France. |
| 927,867 | 6/63 | Great Britain. |

GERALD M. FORLENZA, *Primary Examiner.*